United States Patent
White

(10) Patent No.: US 7,433,691 B1
(45) Date of Patent: Oct. 7, 2008

(54) SYSTEM AND METHOD FOR ENABLING AN ACCESS POINT IN AN AD-HOC WIRELESS NETWORK WITH FIXED WIRELESS ROUTERS AND WIDE AREA NETWORK (WAN) ACCESS POINTS TO IDENTIFY THE LOCATION OF SUBSCRIBER DEVICE

(75) Inventor: Eric D. White, Cedarburg, WI (US)

(73) Assignee: MeshNetworks, Inc., Maitland, FL (US)

( * ) Notice: Subject to any disclaimer, the term of this patent is extended or adjusted under 35 U.S.C. 154(b) by 608 days.

(21) Appl. No.: 10/103,760

(22) Filed: Mar. 25, 2002

(51) Int. Cl.
   *H04Q 7/20* (2006.01)
(52) U.S. Cl. ............ 455/445; 455/41.2; 455/436; 370/255; 370/338; 370/351; 370/400; 370/410
(58) Field of Classification Search ............ 455/517, 455/524–525, 445, 519, 41.2, 426.2, 436; 370/338, 351, 400–401, 331–332, 255, 410
   See application file for complete search history.

(56) References Cited

U.S. PATENT DOCUMENTS

| | | | | |
|---|---|---|---|---|
| 5,412,654 | A * | 5/1995 | Perkins | 370/312 |
| 5,594,731 | A * | 1/1997 | Reissner | 370/338 |
| 5,652,751 | A * | 7/1997 | Sharony | 370/227 |
| 5,717,689 | A * | 2/1998 | Ayanoglu | 370/349 |
| 5,790,536 | A * | 8/1998 | Mahany et al. | 370/338 |
| 5,822,309 | A * | 10/1998 | Ayanoglu et al. | 370/315 |
| 5,875,186 | A * | 2/1999 | Belanger et al. | 370/331 |
| 5,901,362 | A * | 5/1999 | Cheung et al. | 455/525 |
| 5,987,011 | A * | 11/1999 | Toh | 370/331 |
| 6,304,556 | B1 * | 10/2001 | Haas | 370/254 |
| 6,304,745 | B1 * | 10/2001 | Monch | 455/13.1 |
| 6,332,077 | B1 * | 12/2001 | Wu et al. | 455/432.1 |
| 6,480,719 | B1 * | 11/2002 | Schloemer et al. | 455/450 |

(Continued)

*Primary Examiner*—Sharad Rampuria
(74) *Attorney, Agent, or Firm*—Randi L. Karpinia; Joseph J. Buczynski

(57) ABSTRACT

A system and method which enables access points in a wireless ad-hoc communications network to effectively and efficiently determine the approximate location of a mobile node without performing a broadcast flood. The system and method enables a message to be efficiently communicated from an access point of the network, which provides access to a portion of the network or access to another network, to a wireless mobile node in the network. The system and method employ the operations of determining the access point with which the wireless mobile node is affiliated, storing information in a routing table at the affiliated access point pertaining to a routing path from the affiliated access point to the wireless mobile node, and updating the routing path when the wireless mobile node moves by a certain amount. The wireless mobile node can provide this routing path information to the affiliated access point in data packets sent to the affiliated access point. The frequency at which the updating of the routing path information occurs can be based on the degree of mobility of the wireless mobile node. The system and method further perform the operations of providing the message to the affiliated access point, sending the message from the access point to the wireless mobile node by attempting to send the message along the routing path if the routing path is unchanged, and adaptively sending the message along at least one other routing path if the routing path has changed. The frequency of occurrence of the routing path updating is based on a degree of mobility of the wireless mobile node.

27 Claims, 3 Drawing Sheets

U.S. PATENT DOCUMENTS

| | | | |
|---|---|---|---|
| 6,522,884 B2 * | 2/2003 | Tennison et al. | 455/445 |
| 6,535,498 B1 * | 3/2003 | Larsson et al. | 370/338 |
| 6,704,283 B1 * | 3/2004 | Stiller et al. | 370/238 |
| 6,711,409 B1 * | 3/2004 | Zavgren et al. | 455/445 |
| 6,741,856 B2 * | 5/2004 | McKenna et al. | 455/422.1 |
| 6,879,574 B2 * | 4/2005 | Naghian et al. | 370/338 |
| 6,917,804 B2 * | 7/2005 | Takayama et al. | 455/432.1 |
| 6,961,575 B2 * | 11/2005 | Stanforth | 455/445 |
| 7,035,240 B1 * | 4/2006 | Balakrishnan et al. | 370/338 |
| 7,085,241 B1 * | 8/2006 | O'Neill et al. | 370/254 |
| 7,181,214 B1 * | 2/2007 | White | 455/435.1 |
| 2001/0024953 A1 * | 9/2001 | Balogh | 455/432 |
| 2003/0040319 A1 * | 2/2003 | Hansen et al. | 455/452 |
| 2003/0157951 A1 * | 8/2003 | Hasty | 455/519 |

* cited by examiner

SYSTEM AND METHOD FOR ENABLING AN ACCESS POINT IN AN AD-HOC WIRELESS NETWORK WITH FIXED WIRELESS ROUTERS AND WIDE AREA NETWORK (WAN) ACCESS POINTS TO IDENTIFY THE LOCATION OF SUBSCRIBER DEVICE

BACKGROUND OF THE INVENTION

1. Field of the Invention

The present invention relates to a system and method for enabling wired access points on a core network of an ad-hoc communications network to identify the locations of wireless nodes in the network. More particularly, the present invention relates to a system and method for providing route tracing between a wireless node and an access point such that route tracing information can be included with data packets communicated between the node and access point for allowing the access point to identify approximately where to locate a particular node that has changed its position.

2. Description of the Related Art

In recent years, a type of mobile communications network known as an "ad-hoc" network has been developed for use by the military. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each of said patent applications being incorporated herein by reference.

As can be appreciated by one skilled in the art, a wireless ad-hoc network has mobile nodes, some of which are in constant or relatively constant motion. Hence, the location of any given mobile node in the network may be changing continuously at a variable rate, up to a maximum rate of change. The maximum rate of change can be, for example, the speed of vehicles in which the mobile nodes are employed. Due to this constant motion, the ability for any node in the network, or entities outside the network, to find nodes and determine how to route packets to a destination node can be difficult.

For instance, if each node in the network was always aware of the location of all other nodes, it would be a simple matter for a node to find a particular node and route data packets to that node. However, when nodes are mobile, every time a node moves, the other nodes have to be informed of the move, and update their information pertaining to the moving node so as to keep track of the moving node. These update can consume a large amount of the available bandwidth of the network, leaving less bandwidth available to transmit data.

To overcome this problem due to the limited amount of system resources available for updates, the knowledge that each node can possess with regard to its neighbors can be limited to a small subset of nodes. For example, each node can have knowledge of its immediate neighbors within its transmission range, and each of its neighbors' neighbors. In other words, each node could have knowledge of nodes a certain number of hops away, such as two hops away or less. Naturally, each node can have knowledge of other nodes that are a larger number of hops away, but the overhead necessary to keep track of the network grows exponentially as the number of hops is increased.

If the knowledge that a node possesses with regard to other nodes is limited to nodes a certain number of hops away (e.g., two-hops away), an additional mechanism is therefore needed to enable a node to locate nodes outside of this range. Specifically, an access point performs a broadcast flood to query each node within its broadcast range to determine whether any of those nodes have knowledge about another node of interest. That is, the access point sends a message that is received by each of its neighbors within it broadcast range. The nodes in turn send a similar message to the nodes in each of their broadcast ranges. This process continues out to the finite number of hops defined to be the access point's maximum coverage area. Accordingly, all nodes served by an access point are contacted, even those having no knowledge of the node of interest. The broadcast flood mechanism therefore places a huge burden on the network due to the overwhelming number of broadcasts required, and thus significantly wastes network bandwidth resources.

Accordingly, a need exists for a system and method capable of effectively and efficiently monitoring the approximate locations mobile nodes while using only minimal network bandwidth resources.

SUMMARY OF THE INVENTION

An object of the present invention is to provide a system and method which enables access points in a wireless ad-hoc communications network to effectively and efficiently determine the approximate location of a mobile node without performing a broadcast flood.

Another object of the present invention is to provide a system and method for providing route tracing between an access point and a mobile node in a wireless ad-hoc communications network by including said routing information in existing information packets communicated between the access point and the mobile node.

These and other objects are substantially achieved by providing a system and method for communicating a message to a wireless mobile node in a wireless ad-hoc communications network. The system and method employ the operations of determining the access point with which the wireless mobile node is affiliated, storing information in a routing table at the affiliated access point pertaining to a routing path from the affiliated access point to the wireless mobile node, and updating the routing path when the wireless mobile node moves by a certain amount. The wireless mobile node can provide this routing path information to the affiliated access point in data packets sent to the affiliated access point. The frequency at which the updating of the routing path information occurs can be based on the degree of mobility of the wireless mobile node. The system and method further perform the operations of providing the message to the affiliated access point, sending the message from the access point to the wireless mobile node by attempting to send the message along the routing path if the routing path is unchanged, and adaptively sending the message along at least one other routing path if the routing path has changed. The frequency of occurrence of the routing path updating is based on a degree of mobility of the wireless mobile node.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
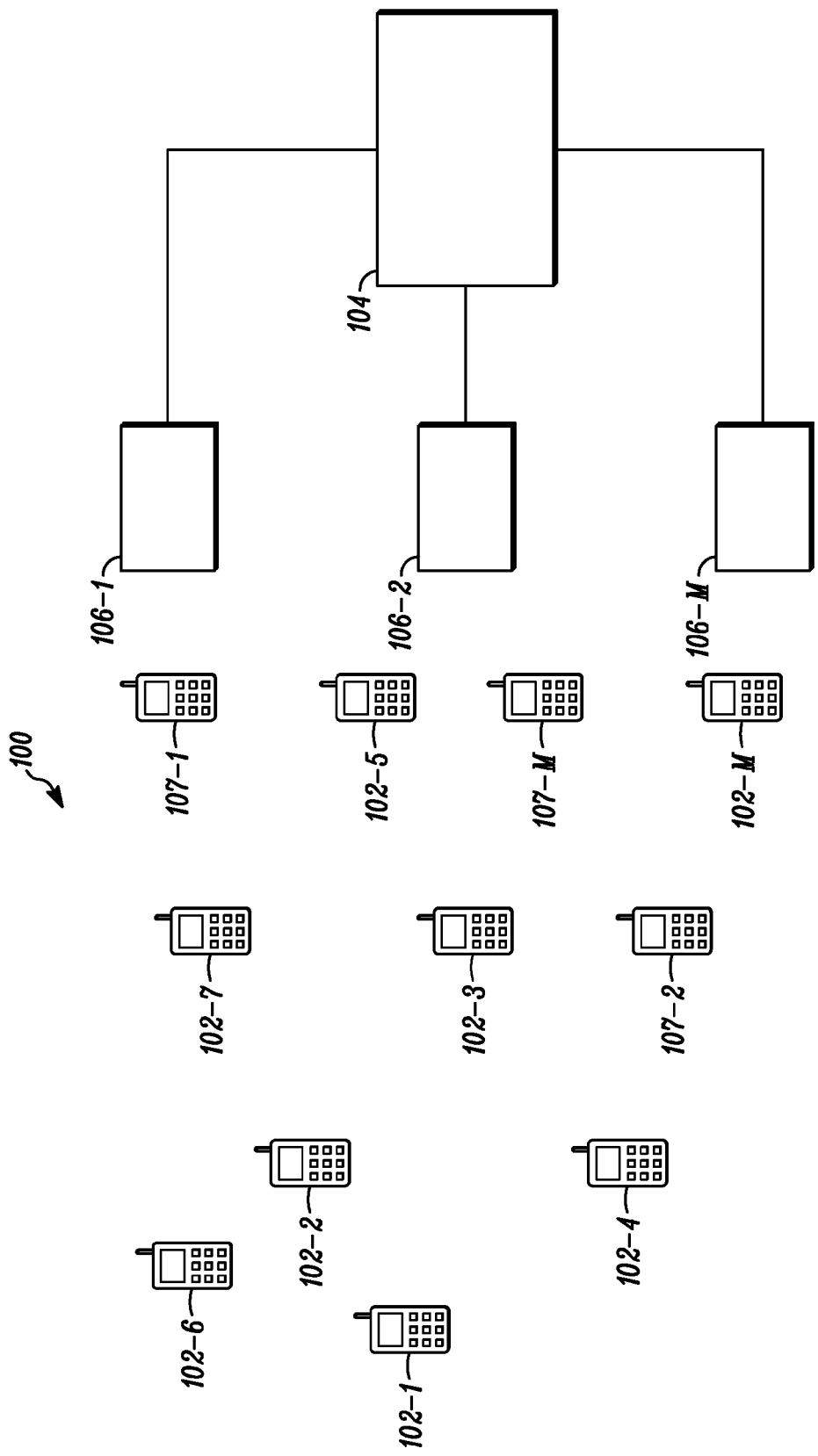
FIG. 1 is a block diagram of an example of a wireless ad-hoc communications network employing a system and method for monitoring locations of mobile nodes according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . , 106-n (referred to generally as nodes or fixed nodes 106), for providing the nodes 102 with access to the fixed network 104. The fixed network 104 includes, for example, a core local access network (LAN), and a plurality of servers and gateway routers, to thus provide the nodes 102 with access to other networks, such as the public switched telephone network (PSTN) and the Internet. The network 100 further includes wireless routers 107-1 through 107-n (referred to generally as nodes 107) for routing data packets between nodes 102, 106 and 107 as described in more detail below.

Figure 2:
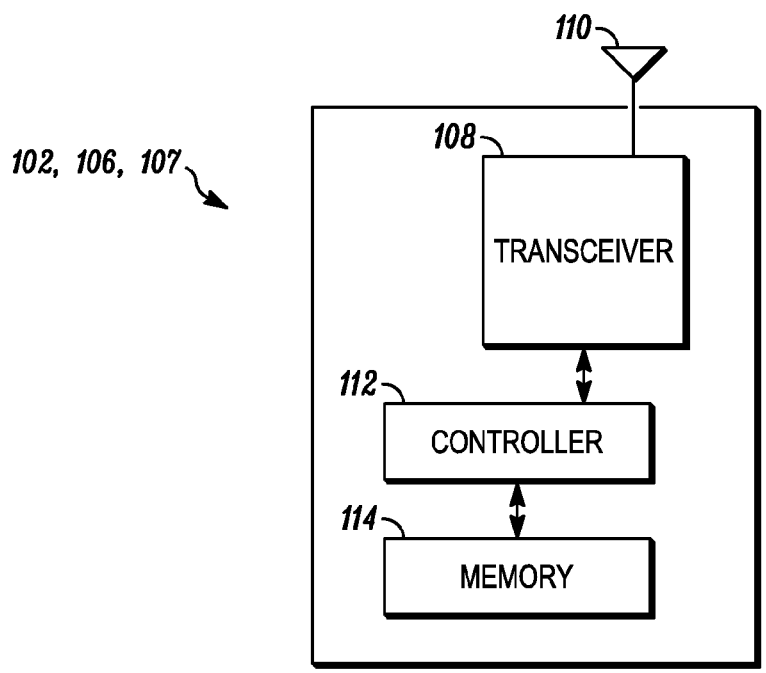
FIG. 2 is a block diagram illustrating an example of components in a node employed in the network shown in FIG. 1.

As can be appreciated by one skilled in the art, the nodes 102, 106 and 107 are capable of communicating with each other directly, or via one or more other nodes 102, 106 or 107 operating as a router or routers for data packets being sent between nodes 102, 106 or 107, as described in U.S. Pat. No. 5,943,322 to Mayor and in U.S. Pat. Nos. 7,072,650, 6,807, 165 and 6,873,839 referenced above. Specifically, as shown in FIG. 2, each node 102, 106 and 107 includes a transceiver 108 which is coupled to an antenna 110 and is capable of receiving and transmitting signals, such as packetized data signals, to and from the node 102, 106 or 107 under the control of a controller 112. The packetized data signals can include, for example, voice, data or multimedia.

Each node 102, 106 and 107 further includes a memory 114, such as a random access memory (RAM), that is capable of storing, among other things, routing information pertaining to itself and other nodes 102, 106 and 107 in the network 100. The nodes 102, 106 and 107 exchange their respective routing information, referred to as routing advertisements or routing table information, with each other via a broadcasting mechanism periodically, for example, when a new node 102 enters the network 100, or when existing nodes 102 in the network 100 move. A node 102, 106 or 107 will broadcast its routing table updates, and nearby nodes 102, 106 or 107 will only receive the broadcast routing table updates if within broadcast range (e.g., radio frequency (RF) range) of the broadcasting node 102, 106 or 107. For example, assuming that nodes 102-1, 102-2 and 102-7 are within the RF broadcast range of node 102-6, when node 102-6 broadcasts its routing table information, that information is received by nodes 102-1, 102-2 and 102-7. However, if nodes 102-3, 102-4 and 102-5 through 102-n, as well as nodes 106 and 107, are out of the broadcast range, none of those nodes will receive the broadcast routing table information from node 102-6.

Each of the nodes 102-1, 102-2 and 102-7 that receive the routing table information from node 102-2 can store all or a relevant portion of that routing table information in their respective memory 114. Typically, each node 102, 106 or 107 will perform a pruning operation to reduce the amount of routing table information that it stores in its memory 114 as can be appreciated by one skilled in the art.

It is also noted that when a node 102, 106 or 107 broadcasts the routing table information to its neighboring nodes 102, 106 or 107, the node 102, 106 or 107 can include routing table information pertaining to some or all of its neighboring nodes 102, 106 or 107 that it has previously received from them and has stored in its memory 108. Accordingly, a node 102, 106 or 107 receiving the broadcast routing table information from another node 102, 106 or 107 also receives some information pertaining to the routing capabilities of the neighbors of that other node 102, 106 or 107. For example, when node 102-2 broadcasts its routing table information, assuming that nodes 102-1 and 102-3 through 102-7 are within the broadcast or RF range, those node will receive the routing table information from node 102-2 and update their routing tables accordingly. This routing table information can include information pertaining to, for example, nodes 102-1, 102-6 and 102-7, which are out of broadcast or RF range of some nodes, such as node 102-3. Hence, node 102-3 can receive routing information pertaining to nodes 102-1, 102-6 and 102-7 via the routing table information broadcast by node 102-2. In this event, a node 102, 106 or 107 can store in its memory 114 routing table information pertaining to nodes 102, 106 or 107 that are several hops away (e.g., two hops away).

As discussed in the Background section above, because at least some of the mobile nodes 102 can move frequently, it becomes difficult in known networks for any node 102, 106 or 107 to locate the position of a mobile node 102 at any given time. Accordingly, if a node in the network 100, for example, mobile node 102-1, attempts to send data packets to mobile node 102-7, mobile node 102-1 may have difficulty in determining the most appropriate routing path to use if mobile node 102-7 has recently moved. Other nodes 102, 106 or 107 within the network 100, or other entities outside the network 100, likewise may have difficulty in reaching mobile node 102-7.

Accordingly, as will now be described with reference to FIGS. 1-4, an embodiment of the present invention provides a system and method that enables an access point 106 to identify the location of a mobile node 102, to thus make those mobile nodes 102 more accessible to other nodes 102, 106 or 107 in the network 100, and to other entities outside the network 100. Specifically, the system and method enables an access point 106 to determine the approximate location of a mobile node 102 (which will be referred to as a "destination node" for purposes of this description), based on routing information previously communicated along with data information between the destination node 102 and access point 106. The destination node 102 can be the final destination for the data packets or, in other words, the node 102 having the Internet Protocol (IP) address to which the data packets are addressed, or can be an intermediate node that is used to route data packets to a final destination node.

According to an embodiment of the present invention, an access point 106 maintains in its memory 114 information pertaining to an exact route, including one or more nodes 102 or 107, that the access point 106 last used to communicate with a node 102 or 107. The access point 106 stores similar information for each node 102 or 107 with which it has communicated. Hence, an access point 106 maintains specific routing path information for each node 102 or 107 that it has communicated with.

Each access point 106 serves a finite number of nodes to the fixed network 104. When a node 102 enters an access point's 106 serving area, the node 102 registers with the access point 106. Fixed routers 107 are also registered with an access point 106 when they are placed in the network 100. Each node 102 registers with only one access point 106 at a time by receiving a local address from the access point 106. This local address is used to route data to the node 102 from another node 102, 106 and 107 in the network 100, or from a device (not shown) outside the network 100. Further details of an example of the manner in which a node 102 registers with an access point 106, and changes its affiliation to another access point 106 when the node 102 moves, is described in U.S. Pat. No. 7,072,323 of Robin U. Roberts et al. entitled "A System and Method for Performing Soft Handoff in a Wireless Data Network", issued on Jul. 4, 2006, the entire contents of which being incorporated herein by reference.

Figure 3:
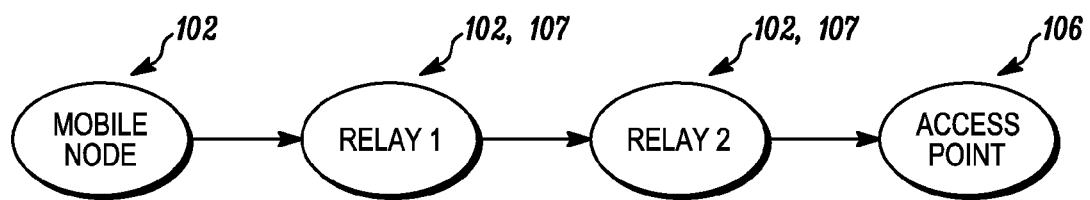
FIG. 3 is a diagram illustrating an example of a routing path via which a mobile node sends a data packet to an intelligent access point in the network shown in FIG. 1.

In the process of maintaining registration between mobile nodes 102 and an access point 106, data packets are routinely transmitted from each of those mobile nodes 102 and the access point 106, and the respective routes taken by the data packets are recorded by the respective nodes 102 and the access point 106 in their respective routing tables. For example, as shown in FIG. 3, a mobile node 102 can send a data packet to an access point 106 via intermediate nodes 102 or 107 which are identified as "relay 1" and "relay 2". The mobile node 102 can place its address in the data packet or, in other words, "piggyback" its address onto the data packet. Likewise, as the data packet travels through relays 1 and 2, each of relays 1 and 2 can piggyback its address onto the data packet. When the location of a destination node 102 (e.g., mobile node 102 shown in FIG. 3) is required by an entity either outside the network 100, or by an entity (e.g., another mobile node 102) within the network 100 that is registered either with the same access point 106 as the destination node 102 or with a different access point 106, the recorded routing path can be used to send a directed message to the destination node 102 in order to establish a connection between the destination node 102 and the entity. If the destination node 102 has not moved, the destination node 102 will always be found at the end of the recorded path.

However if the destination node 102 has moved, the ability to find the destination node 102 using the route tracing information is dependent on the duration of time that has elapsed between the time of the last recorded path and the current time. The larger the duration of elapsed time, the greater the probability that the destination node 102 has moved. The variable factors in this equation are how much time has elapsed since the last path was recorded, the speed of the destination node 102, and the maximum range of the nodes and access points in the network 100.

The speed of the destination node 102 can be approximated by the use of periodic location updates which can provide a time/distance moved delta indicating a general assumption about the rate of movement of the destination node 102. The range of a node 102, 106 or 107 is the size of the area of coverage of a node 102, 106 or 107, and how long a mobile node 102 is inside that coverage area. The length of time that a mobile node 102 is within a coverage area of a node 102, 106 or 107 depends on the portion of the coverage area that the mobile node 102 transverses. For example, assuming that a coverage area can be represented by a sphere, if a mobile node 102 travels through the outer portion of the sphere at a particular rate of travel, the mobile node 102 is only in the coverage area for a brief period of time. However, if the mobile node 102 travels close to or through the center of the sphere at that same rate of travel, the mobile node 102 is within the coverage area for a longer period of time. The rate of movement can be represented by the distance traveled by the node 102 between two points divided by the time for the node to travel between the two points (e.g., if the two points are 1 mile apart and the node travels between them in 1 minute, then the node is traveling at 60 mph). Examples of techniques for determining the location of a mobile node in this manner is described in a U.S. Pat. No. 6,768,730 of Eric A. Whitehill entitled "A System and Method for Efficiently Performing Two-Way Ranging to Determine the Location of a Wireless Node in a Communications Network", issued on Jul. 27, 2004, the entire contents being incorporated by reference.

Figure 4:
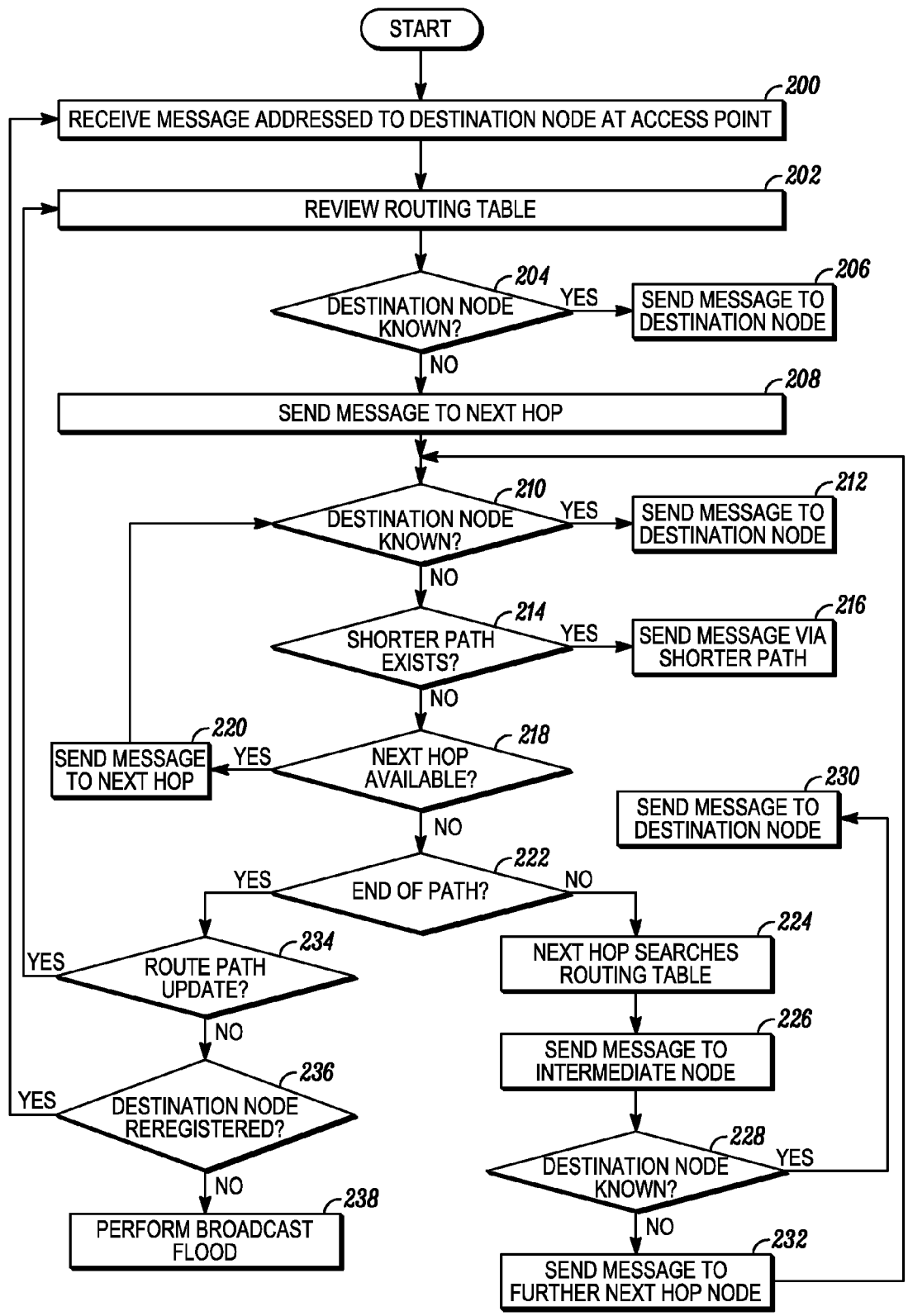
FIG. 4 is a flowchart illustrating an example of operations performed by the network shown in FIG. 1 for monitoring the location of a mobile node according to an embodiment of the present invention

An example of the operations that an access point 106 performs to locate a destination node 102 will now be described with reference to the diagram shown in FIG. 3 and the flowchart shown in FIG. 4. In step 200, a message addressed to a destination node 102 (mobile node 102 in FIG. 3) is received by an access point 106 with which the destination node 102 last registered. The message can have originated, for example, at another node 102 in the network 100 that is registered with this access point 106 or with another access point, or at another device outside the network 100.

Upon receiving the message, the access point 106 consults its routing table stored in its memory 114 in step 202 to determine if the path to the destination node 102 is known. This routing path information could have been provided to the access point 106 via specific routing information data packets sent from the destination node 102, or as information contained in existing data packets sent from the destination node 102 via intermediate nodes 102 or 107 identified in FIG. 3 as "relay 1" and "relay 2" as discussed above. In other words, the routing path information could be "piggybacked" on already existing data packets 102 sent from the destination node 102 in the manner discussed above. The other relay nodes 102 or 107 along the path via which the destination node 102 sent the data packets to the access point 102 can also update their routing tables based on this routing path information.

A determination is then made in step 204 as to whether the path to the destination node 102 is already known, meaning that the destination node 102 is within a small number of hops (e.g., two hops) from the access point 106. If the controller 112 of the access point 106 determines that the path to the destination node 102 is already known, the operation proceeds to step 206 where the access point 106 sends the message to the destination node 102 by normal routing via the known path, which can include one or more nodes 102 and 107.

However, if the controller 112 of the access point 106 determines that the path to the destination node is not known or, in other words, the destination node 102 is not within a small number of hops, the operation proceeds to step 208 where the access point 106 sends a direct message to the node 102 or 107 at the next hop in the recorded path (i.e., the path including relays 1 and 2 as shown in FIG. 3), referred to as the "next hop node". In this part of the example, the next hop node is the node 102 or 107 identified as "relay 2" in FIG. 3. In step 210, the next hop node (relay 2) that receives the message consults its routing table to determine if it recognizes the address of destination node 102. If the next hop node recognizes the destination node 102, the next hop node can provide the message to the destination node 102 in step 212. If not, the operation proceeds to step 214 where the next hop node determines whether its routing table includes information indicating that the destination node 102 has moved to a different path which can preferably be shorter than the original recorded path. If so, the next hop node provides the message to the node 102 or 107 at the next hop in this shorter path in step 216, and the message is provided to the destination node 102 via this shorter path by normal routing. In other words, if the next hop node can send the message to the destination node 102 via normal routing, the normal routing will be performed instead of sending the message along the known path.

If no shorter path exists, the operations proceed to step 218 where the next hop node determines if the next hop (i.e., relay 1) in the last recorded path is still available. If so, the next hop node sends the message to this further next hop node (relay 1) in step 220, and the operations discussed above beginning at step 210 are repeated with this further next hop node acting as the next hop node.

However, if the controller of the next hop node determines in step 218 that the further next hop node in the recorded path is not available, it can be determined in step 222 if the next hop node is the end of the path. If not, the next hop node can search its routing table in step 224 to determine that the further next hop has moved, for example, out to two hops away. In step 226, the next hop node can attempt to forward the message to the further next hop node in the recorded path via an intermediate node, even though that further next hop node is now two hops away (but still remains the next hop in the recorded path). The algorithm being run by the controller 112 at the intermediate node that was not in the recorded path detects this condition and realizes that its address is not in the recorded path, and determines in step 228 whether the destination node is in its routing table and whether it can thus route the message to the destination node via normal routing. If so, the intermediate node sends the message to the destination node in step 230 via normal routing. If not, in step 232, the intermediate node will find the address of the previous hop (referred to as the "next hop node" in the above discussion) from which the intermediate node received the message, and forward the message to the further next hop node which is "after" the previous hop in the recorded path, assuming that the previous hop was not able to reach the recorded next hop directly anymore, and was using this intermediate node as a relayer. The processing then returns to step 210 and repeats as above with this further next hop node acting as the next hop node as discussed above.

The above operations are repeated until either the message has been provided to the destination node 102, or the entire recorded path has been searched without finding the destination node. For example, if the destination node 102 cannot be found and it is determined in step 222 that the entire recorded path has been searched, it is likely that the destination node 102 has moved out of signaling range served by access point 106, and has reregistered with another access point 106 in a manner as described, for example, in U.S. patent application Ser. No. 09/929,013, referenced above. Performing this process of deregistering with the original serving access point 106 and reregistering with another access point 106 will inform nodes 102 or 107 seeking communication with the destination node 102 that their search should be directed to the access point 106 with which the destination node 102 is now registered.

Accordingly, in step 234, the original access point 106 performs a recheck to determine if a route path update has been received by the original access point 106. The frequency at which the route path updates should be made can be determined based on the mobility of the nodes 102 as described, for example, in a U.S. patent application of Eric. D White entitled "A System and Method for Determining the Measure of Mobility of a Subscriber Device in an Ad-Hoc Wireless Network with Fixed Wireless Routers and Wide Area Network (WAN) Access Points", Ser. No. 09/987,102, filed on Nov. 13, 2001, the entire contents of which being incorporated herein by reference.

If a route path update has occurred, the process described above with regard to the flowchart shown in FIG. 4 can be repeated for the new recorded route path. If no route path update has occurred, the original access point 106 can determine in step 236 if the destination node 102 has registered with another access point 106. If so, the operations discussed above with regard to the flowchart in FIG. 4 can be performed beginning at this new access point 106. As a last resort, a broadcast flood can be performed in step 238. However, this above process, as well as the routing path updating process described in U.S. patent application Ser. No. 09/987,102 referenced above, makes the need to perform a broadcast flood nearly zero.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of sending a message from an access point to a wireless mobile node in an ad-hoc wireless network, said ad-hoc wireless network comprising a plurality of nodes and at least one access point which provides said wireless mobile node and said plurality of nodes with access to at least one of a portion of said network and a wired network, wherein said wireless mobile node's location in said ad-hoc wireless network changes at a non-deterministic rate, said method comprising:

affiliating said wireless mobile node with said access point;

identifying and storing at said affiliated access point a first routing path and associated information from said affiliated access point to said wireless mobile node, said first routing path including at least one other of said nodes between said affiliated access point and said wireless mobile node;

identifying and storing at said affiliated access point a second routing path and associated information from said affiliated access point to said wireless mobile node when said wireless mobile node moves by at least a certain amount, said second routing path including at least one other of said nodes between said affiliated access point and said wireless mobile node;

providing said message to said affiliated access point; and sending said message from said affiliated access point to said wireless mobile node along said first routing path when said wireless mobile node has not moved by said certain amount and sending said message from said affiliated access point to said wireless mobile node along said second routing path when said wireless mobile node has moved by at least said certain amount.

2. A method as claimed in claim 1, wherein:

a frequency of occurrence of identifying said second routing path is based on a degree of mobility of said wireless mobile node.

3. A method as claimed in claim 1, wherein:

said storing steps stores said routing path information in a routing table at said affiliated access point.

4. A method as claimed in claim 1, wherein:

each of said first routing path and said second routing path includes at least one of said nodes other than said wireless mobile node.

5. A method as claimed in claim 1, wherein:

said wireless mobile node provides said routing path information included in data packets sent to said affiliated access point.

6. A method as claimed in claim 1, wherein:

said message includes a data packet.

7. A method of communicating between a wireless mobile node in an ad-hoc wireless network comprising a plurality of nodes and an access point with which said wireless mobile node is affiliated, wherein said affiliated access point provides said wireless mobile node and said plurality of nodes with access to at least one of a portion of said ad-hoc wireless network and a wired network, wherein said wireless mobile node's location in said ad-hoc wireless network changes at a non-deterministic rate, said method comprising:

sending data from said wireless mobile node via a routing path to said access point, said routing path including at least one other of said nodes between said affiliated access point and said wireless mobile node, and said data including an address of said wireless mobile node and a respective address for each said other node in said routing path;

storing information at said affiliated access point pertaining to said routing path from said affiliated access point to said wireless mobile node;

sending a second data from said wireless mobile node via a second routing path to said affiliated access point when said wireless mobile node has moved by a certain amount, said second routing path including at least one other of said nodes between said affiliated access point and said wireless mobile node, and said data including an address of said wireless mobile node and a respective address for each said other node in said second routing path; and storing information at said affiliated access point pertaining to said second routing path from said affiliated access point to said wireless mobile node.

8. A method as claimed in claim 7, wherein each of said sending steps comprises:

including said address of said wireless mobile node in said data when said wireless mobile node sends said data to said at least one other node; and each said at least one other node including its said respective address in said data when it sends said data along said routing path.

9. A method as claimed in claim 7, wherein:

said data is configured as at least one data packet.

10. A method as claimed in claim 7, further comprising:

sending a message from said affiliated access point to said wireless mobile node along said routing path when said wireless mobile node has not moved by said certain amount; and sending said message from said affiliated access point to said wireless mobile node along said second routing path when said wireless mobile node has moved by said certain amount.

11. An access point in an ad-hoc wireless network comprising a plurality of nodes, wherein said plurality of nodes comprises at least one wireless mobile node having a location in said ad-hoc wireless network which changes at a non-deterministic rate, said access point providing said nodes with access to at least one of a portion of said ad-hoc wireless network and a wired network, said access point comprising:

a controller, for determining whether a wireless mobile node is affiliated with said access point; and a memory, for storing information pertaining to a routing path from said affiliated access point to said wireless mobile node, said routing path including at least one other of said nodes in said network between said affiliated access point and said wireless mobile node, and said information being provided by said wireless mobile node and said at least one other node in said routing path;

said controller further operating to:

identify and store in said memory a first routing path and associated information from said affiliated access point to said wireless mobile node;

identify and store a second routing path and associated information from said affiliated access point to said wireless mobile node when said wireless mobile node moves by at least a certain amount; and send a message to said wireless mobile node along said first routing path when said wireless mobile node has not moved by said certain amount and by sending said message to said wireless mobile node along said second routing path when said wireless mobile node has moved by at least said certain amount.

12. An access point as claimed in claim 11, wherein:

a frequency of occurrence of said second routing path identifying is based on a degree of mobility of said wireless mobile node.

13. An access point as claimed in claim 11, wherein:

said memory stores said routing path information in a routing table.

14. An access point as claimed in claim 11, wherein:

said routing path information is included in at least one data packet.

15. A method as claimed in claim 11, wherein:

said message includes a data packet.

16. An ad-hoc wireless communication network, comprising:

a plurality of nodes; and at least one access point for providing said nodes with access to at least one of a portion of said network and a wired network;

at least one of said nodes being a wireless mobile node, wherein said wireless mobile node's location within said ad-hoc wireless communication network changes at a non-deterministic rate, and wherein said wireless mobile node sends data via a routing path to an affiliated access point with which said wireless mobile node is affiliated, said routing path including at least one other of said nodes between said affiliated access point and said wireless mobile node, and said data including an address of said wireless mobile node and a respective address for each said other node in said routing path; and said affiliated access point operating to:
- identify and store a first routing path and associated information from said affiliated access point to said wireless mobile node;
- identify and store a second routing path and associated information from said affiliated access point to said wireless mobile node when said wireless mobile node moves by at least a certain amount; and
- send at least one message to said wireless mobile node along said first routing path when said wireless mobile node has not moved by said certain amount and by sending said message to said wireless mobile node along said second routing path when said wireless mobile node has moved by at least said certain amount.

17. An ad-hoc wireless communication network as claimed in claim 16, wherein:
- said wireless mobile node includes said address of said wireless mobile node in said data when said wireless mobile node sends said data to said at least one other node; and
- each said at least one other node includes its said respective address in said data when it sends said data along said routing path.

18. An ad-hoc wireless communication network as claimed in claim 16, wherein:
said data is configured as at least one data packet.

19. A method for locating a mobile node having a location which changes at a non-deterministic rate within an ad-hoc wireless network for communication of a message destined for the mobile node, the method comprising:
at a node within the ad-hoc wireless network:
- receiving the message destined for the mobile node;
- determining if a current path to the mobile node is stored within the node;
- sending the message directly to a next hop node in a last recorded path stored within the node when the current path to the mobile node is not stored within the node;
- verifying whether the next hop node is the mobile node; and
- when the next hop node is not the mobile node, repeating the receiving, determining, and sending steps within the next hop node for a further next hop node and repeating the verifying and repeating steps.

20. A method for locating a mobile node within an ad-hoc wireless network for communication of a message destined for the mobile node as claimed in claim 19, wherein the node includes a routing table for storing one or more routing paths associated with each of a plurality of nodes, and wherein the determining step comprises querying the routing table for the current path and the last recorded path.

21. A method for locating a mobile node within an ad-hoc wireless network for communication of a message destined for the mobile node as claimed in claim 19, wherein the node comprises an access point, the method further comprising:
registering the mobile device with the access point prior to the receiving step, wherein the registering includes providing a routing path to the mobile device.

22. A method for locating a mobile node within an ad-hoc wireless network for communication of a message destined for the mobile node as claimed in claim 19, the method further comprising:
sending the message to the mobile node along the current path when the current path to the mobile node is stored within the node.

23. A method for locating a mobile node within an ad-hoc wireless network for communication of a message destined for the mobile node as claimed in claim 19, further comprising prior to the receiving step:
receiving one or more routing information associated with the current path from the mobile node.

24. A method for locating a mobile node within an ad-hoc wireless network for communication of a message destined for the mobile node as claimed in claim 23, wherein the one or more routing information is contained within one or more routing information data packets received from the mobile node.

25. A method for locating a mobile node within an ad-hoc wireless network for communication of a message destined for the mobile node as claimed in claim 23, wherein the one or more routing information is contained within one or more data packets along with one or more other data information received from the mobile node via one or more intermediate nodes.

26. A method for locating a mobile node within an ad-hoc wireless network for communication of a message destined for the mobile node as claimed in claim 19, wherein the current path is deleted from the node when one or more of a group of events occurs selected from a group of events comprising a duration of time elapsed since the last recorded path, a speed of the mobile node, and the maximum range of the nodes and access points in the network.

27. A method for locating a mobile node within an ad-hoc wireless network for communication of a message destined for the mobile node as claimed in claim 19, wherein the next hop node is a mobile next hop node, the method further comprising prior to the sending the message directly to a next hop node step:
- determining whether a direct path to the next hop node is stored within the node; and
- when the direct path to the next hop node is not stored within the node,
- identify a previous hop node;
- identify another next hop node after the previous hop node in the recorded path; and
send the message to the another next hop node after the previous hop node in the recorded path.

* * * * *